US012806461B2

(12) United States Patent
Kjellman

(10) Patent No.: US 12,806,461 B2
(45) Date of Patent: Nov. 24, 2026

(54) HOOD ASSEMBLY, METHOD FOR ASSEMBLING HOOD ASSEMBLY AND FIRESUPPRESSION SYSTEM COMPRISING HOOD ASSEMBLY

(71) Applicant: Kidde-Fenwal, LLC, Ashland, MA (US)

(72) Inventor: Thomas Kjellman, Uxbridge, MA (US)

(73) Assignee: Kidde-Fenwal, LLC, Ashland, MA (US)

(*) Notice: Subject to any disclaimer, the term of this patent is extended or adjusted under 35 U.S.C. 154(b) by 246 days.

(21) Appl. No.: 18/479,802

(22) Filed: Oct. 2, 2023

(65) Prior Publication Data

US 2024/0131377 A1 Apr. 25, 2024
US 2024/0226630 A9 Jul. 11, 2024

Related U.S. Application Data

(60) Provisional application No. 63/380,387, filed on Oct. 21, 2022.

(51) Int. Cl.
*A62C 37/42* (2006.01)
*A62C 3/00* (2006.01)

(52) U.S. Cl.
CPC .............. *A62C 37/42* (2013.01); *A62C 3/006* (2013.01)

(58) Field of Classification Search
CPC ........ A62C 37/42; A62C 3/006; F16K 31/465
See application file for complete search history.

(56) References Cited

U.S. PATENT DOCUMENTS 2,479,801 A * 8/1949 Woodworth ........... A62C 35/02 169/58
3,378,081 A * 4/1968 O'Reilly ................ A62C 37/42 169/17
3,463,236 A * 8/1969 Andersen ............... A62C 37/12 169/59
3,824,374 A * 7/1974 Mayher .................... H02H 5/00 169/65
4,238,971 A * 12/1980 Amelio ............... F16C 11/0614 248/548
4,253,527 A * 3/1981 Wilhoit .................. A62C 37/00 169/42

(Continued)

*Primary Examiner* — Joseph A Greenlund
(74) *Attorney, Agent, or Firm* — HONIGMAN LLP; Andrew J. Boes; Jonathan P. O'Brien

(57) ABSTRACT

A hood assembly is disclosed. The hood assembly includes a housing having first and second walls arranged opposite to each other, the first and second walls being vertically oriented with respect to a floor on which the hood assembly is placed. The hood assembly includes a mechanical fire detection line configured to detect presence of a fire within the housing. The mechanical fire detection line is disposed between the first and second walls, and extending beyond the second wall. The hood assembly further includes a restricting element disposed on the second wall, such that the mechanical fire detection line extends beyond the second wall of the hood assembly by passing through the restricting element. The restricting element is adapted to allow movement of the mechanical fire detection line along a first direction, and restrict movement of the mechanical fire detection line along a second direction opposite to the first direction.

11 Claims, 3 Drawing Sheets

(56) References Cited

U.S. PATENT DOCUMENTS

| | | | | |
|---|---|---|---|---|
| 4,313,501 | A * | 2/1982 | Eckert | A62C 37/12 222/83.5 |
| 4,889,313 | A * | 12/1989 | Sanchez | F16K 31/465 251/74 |
| 5,645,128 | A * | 7/1997 | Schwall | A62C 37/44 169/42 |
| 5,871,056 | A * | 2/1999 | Renna | A62C 37/12 169/65 |
| 6,286,604 | B1 * | 9/2001 | Ou | A62C 37/46 169/56 |
| 6,341,655 | B1 * | 1/2002 | Busian | A62C 2/04 169/59 |
| 9,352,176 | B2 * | 5/2016 | Erva | G08B 17/00 |
| 9,656,107 | B2 * | 5/2017 | Zlatintsis | A62C 37/46 |
| 11,114,826 | B2 * | 9/2021 | Napoli | A62C 3/16 |
| 11,199,286 | B1 * | 12/2021 | Beranek | F16L 55/1141 |
| 11,541,262 | B2 * | 1/2023 | Kjellman | A62C 37/42 |
| 12,064,658 | B2 * | 8/2024 | Cirilli | A62C 3/006 |
| 12,228,959 | B2 * | 2/2025 | Bouchard | A62C 3/006 |
| 2005/0126797 | A1 * | 6/2005 | Mikulec | A62C 37/38 169/65 |
| 2007/0246234 | A1 * | 10/2007 | Vegso | A62C 37/12 169/59 |
| 2011/0186168 | A1 * | 8/2011 | Rose, Jr. | F16L 9/14 138/140 |
| 2011/0214888 | A1 * | 9/2011 | Alchalel | A62C 37/36 169/46 |
| 2015/0231432 | A1 * | 8/2015 | Zlatintsis | A62C 37/46 169/61 |
| 2017/0340911 | A1 * | 11/2017 | Meyer | F16K 31/465 |
| 2020/0338376 | A1 * | 10/2020 | Kjellman | A62C 37/42 |
| 2021/0175694 | A1 * | 6/2021 | Napoli | A62C 3/006 |
| 2021/0213312 | A1 * | 7/2021 | Anderson | A62C 3/00 |
| 2021/0361991 | A1 * | 11/2021 | Piech | A62C 37/40 |
| 2021/0370115 | A1 * | 12/2021 | Kjellman | A62C 37/48 |
| 2022/0062679 | A1 * | 3/2022 | Cirilli | A62C 3/006 |
| 2023/0211193 | A1 * | 7/2023 | Kjellman | A62C 3/006 74/491 |
| 2023/0405375 | A1 * | 12/2023 | Kjellman | A62C 3/006 |
| 2024/0001187 | A1 * | 1/2024 | Kjellman | A62C 3/006 |
| 2024/0115894 | A1 * | 4/2024 | Kjellman | A62C 37/42 |
| 2024/0131377 | A1 * | 4/2024 | Kjellman | A62C 3/006 |
| 2024/0226630 | A9 * | 7/2024 | Kjellman | A62C 37/42 |

* cited by examiner

HOOD ASSEMBLY, METHOD FOR ASSEMBLING HOOD ASSEMBLY AND FIRESUPPRESSION SYSTEM COMPRISING HOOD ASSEMBLY

CROSS-REFERENCE TO RELATED APPLICATION

This patent application claims the benefit of priority of U.S. Provisional Patent Application No. 63/380,387, filed on Oct. 21, 2022.

TECHNICAL FIELD

This invention relates to the field of fire suppression systems, and more particularly, to a hood assembly of a fire suppression system.

BACKGROUND

Fire suppression systems for industrial and commercial applications may include mechanical fire detection lines, which may include sensors to detect fires. The mechanical fire detection lines further include one or more tensioned lines that couple the sensors together. Once a fire is detected by any sensor, the sensor breaks, and the tensioned lines that were previously held under tension are now lax. This loss in tension may be used as a control signal to activate a control box to deploy countermeasures to limit the fire. Typically, mechanical fire detection lines are installed onsite. Generally, the mechanical fire detection lines are installed in a hood of commercial applications such as kitchens. However, due to different manufacturers of hoods, and the many variations of hoods, installations of such mechanical fire detection lines may require modifications to be made to either the hoods, or the mechanical fire detection lines. As a result, the onsite installation process may be laborious and a potential for errors may also increase.

SUMMARY

Disclosed herein is a hood assembly. The hood assembly includes a housing having first and second walls arranged opposite to each other, the first and second walls being vertically oriented with respect to a floor on which the hood assembly is placed. The hood assembly further includes a mechanical fire detection line configured to detect presence of a fire within the housing. The mechanical fire detection line is disposed between the first and second walls, and extending beyond the second wall. The hood assembly further includes a restricting element disposed on the second wall, such that the mechanical fire detection line extends beyond the second wall of the hood assembly by passing through the restricting element. The restricting element is adapted to allow movement of the mechanical fire detection line along a first direction, and restrict movement of the mechanical fire detection line along a second direction opposite to the first direction.

In one or more embodiments, the first direction is along a length of the mechanical fire detection line towards the second wall. The second direction is along the length of the mechanical fire detection line towards the first wall.

In one or more embodiments, the second wall includes a through hole through which the mechanical fire detection line passes.

In one or more embodiments, the restricting element includes a through hole. The restricting element is disposed on the second wall, such that the through hole of the restricting element is coaxial with the through hole on the second wall. The mechanical fire detection line further passes through the through hole on the restricting element.

In one or more embodiments, the second wall includes a recess. The second wall includes a through hole at the recess.

In one or more embodiments, the restricting element is disposed on the second wall at the recess.

In one or more embodiments, the mechanical fire detection line further includes an output. The mechanical fire detection line terminates at the output after it extends beyond the second wall of the hood assembly.

In one or more embodiments, the restricting element includes a locking mechanism. Actuating the locking mechanism causes the restricting element to restrict movement of the mechanical fire detection line along the second direction.

Also disclosed herein is a method for assembling a hood assembly. The method includes providing a housing having first and second walls arranged opposite to each other. The first and second walls are vertically oriented with respect to a floor on which the hood assembly is placed. The method further includes providing a mechanical fire detection line configured to detect presence of a fire within the housing. The mechanical fire detection line is disposed between the first and second walls, and extending beyond the second wall. The method further includes providing a restricting element disposed on the second wall, such that the mechanical fire detection line extends beyond the second wall of the hood assembly by passing through the restricting element. The restricting element is adapted to allow movement of the mechanical fire detection line along a first direction, and restrict movement of the mechanical fire detection line along a second direction opposite to the first direction.

In one or more embodiments, the first direction is along a length of the mechanical fire detection line towards the second wall. The second direction is along the length of the mechanical fire detection line towards the first wall.

In one or more embodiments, the method further includes providing a through hole on the second wall through which the mechanical fire detection line passes.

In one or more embodiments, the method further includes providing a through hole on the restricting element. The restricting element is disposed on the second wall such that the through hold of the restricting element is coaxial with the through hole on the second wall. The mechanical fire detection line further passes through the through hole on the restricting element.

In one or more embodiments, the method further includes providing a recess on the second wall. The second wall includes a through hole at the recess.

In one or more embodiments, the restricting element is disposed on the second wall at the recess.

In one or more embodiments, the method further includes providing the mechanical fire detection line with an output. The mechanical fire detection line terminates at the output after it extends beyond the second wall of the hood assembly.

In one or more embodiments, the method further includes providing the restricting element with a locking mechanism. Actuating the locking mechanism causes the restricting element to restrict movement of the mechanical fire detection line along the second direction.

Also disclosed herein is a fire suppression system including a hood assembly. The hood assembly includes a housing having first and second walls arranged opposite to each other, the first and second walls being vertically oriented with respect to a floor on which the hood assembly is placed. The hood assembly further includes a mechanical fire detection line configured to detect presence of a fire within the housing. The mechanical fire detection line is disposed between the first and second walls, and extending beyond the second wall. The hood assembly further includes a restricting element disposed on the second wall, such that the mechanical fire detection line extends beyond the second wall of the hood assembly by passing through the restricting element. The restricting element is adapted to allow movement of the mechanical fire detection line along a first direction, and restrict movement of the mechanical fire detection line along a second direction opposite to the first direction.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components.

Figure 1:
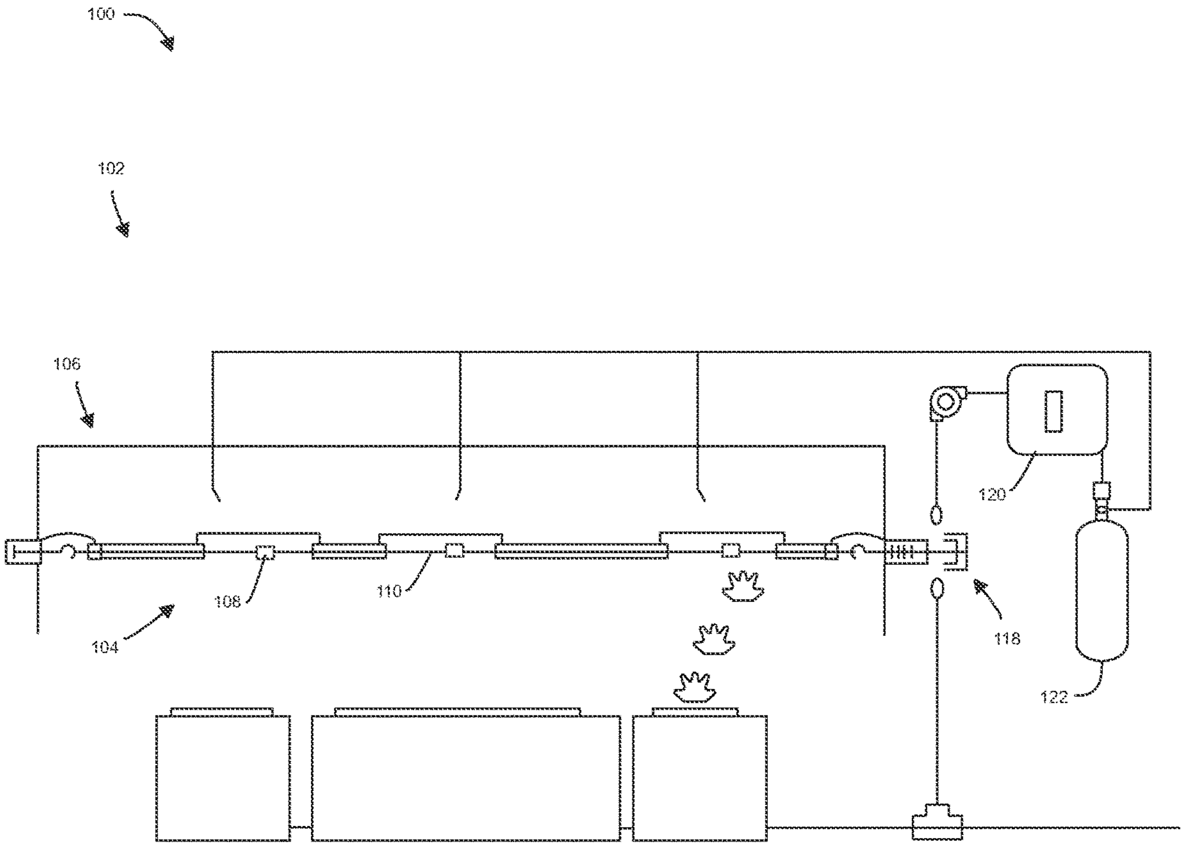
FIG. 1 is an exemplary schematic view of a fire suppression system diagram illustrating an exemplary fire suppression system.

Referring to FIG. 1, an exemplary schematic view of a fire suppression system 100 is shown. The fire suppression system 100 may be used in industrial and commercial applications. In the illustrated view of FIG. 1, the fire suppression system 100 is one used in a commercial cooking application 102. The fire suppression system 100 includes a mechanical fire detection line 104 disposed within a hood 106 of the commercial cooking application 102. The mechanical fire detection line 104 may include one or more sensors 108 that are linked together via a tensioned line 110. When a fire may break out, the heat of the fire may cause one or more sensors 108 to break, thereby causing a drop in a tension of the tensioned line 110. This decrease in the tension of the tensioned line 110 may be used as a control signal to operate a control box 120. The control box 120 may then deploy countermeasures to suppress the fire that broke out. The countermeasures may include dispensing a fire suppression agent that is stored in a canister 122.

Generally, an assembly or installation of the mechanical fire detection line 106 in the hood 106 of the commercial cooking application 102 occurs on site. In some cases, the hood 106 may include conduits for carrying the mechanical fire detection line 106. However, the installation of the mechanical fire detection line 106 and the subsequent tensioning of the mechanical fire detection line 106 is generally accomplished onsite. As a result, the installation process is more laborious. Further, the chances of errors in installation may be higher, which may lead to a failure in an operation of the mechanical fire detection line 106, resulting in the fire suppression system performing sub-optimally.

Figure 2:
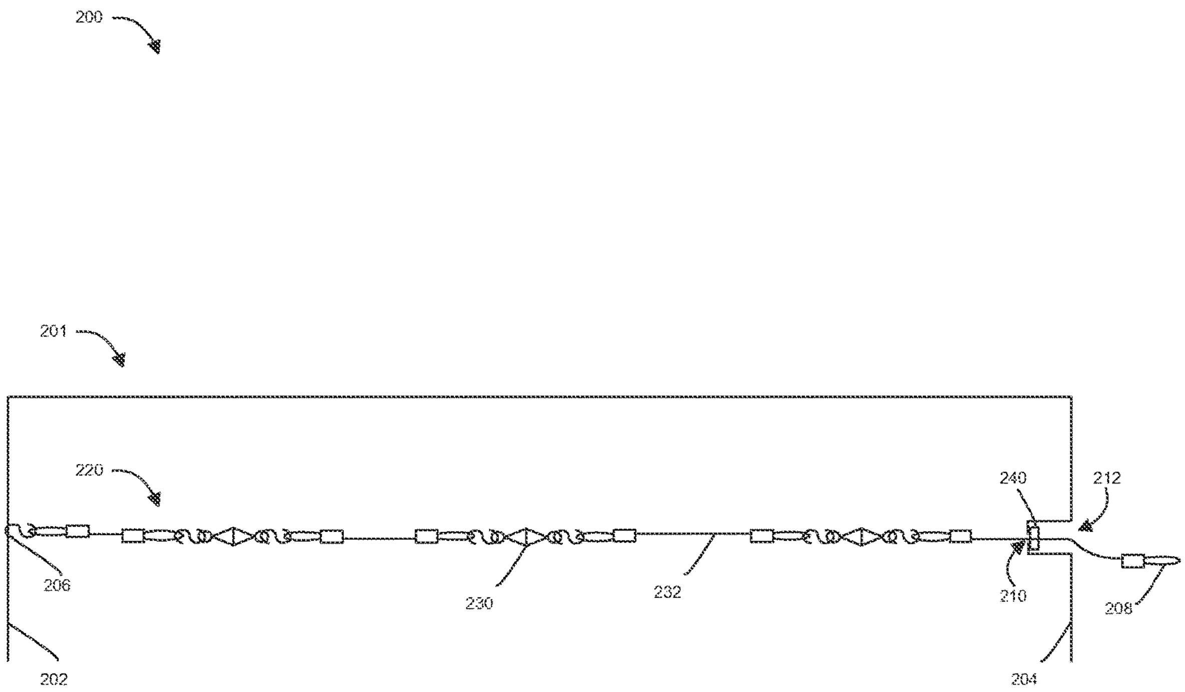
FIG. 2 is a schematic view of a hood assembly for a fire suppression system including a mechanical fire detection line, in accordance with an embodiment of the invention.

FIG. 2 shows a schematic view of a hood assembly 200 including a mechanical fire detection line 220. The mechanical fire detection line 220 may be installed within the hood assembly 200 at a location where the hood assembly 200 is being assembled, such as at a fabrication facility, or an assembly facility. The hood assembly 200 may include a housing 201 including first and second walls 202, 204, which are adapted to be placed in a floor of a location where the hood assembly 200 is being installed. The first and second walls 202, 204 may be rigid structures, which are also adapted to provide structural support to the hood assembly 200. The hood assembly 200 further includes the mechanical fire detection line 220. The mechanical fire detection line 220 may be disposed between the first and second walls 202, 204 of the hood assembly 200. The mechanical fire detection line 220 includes an anchor 206 adapted to be rigidly coupled to any of the first and second walls 202, 204 of the hood assembly 200. In the illustrated embodiment of FIG. 2, the anchor 206 of the mechanical fire detection line 202 is rigidly coupled to the first wall 202.

The mechanical fire detection line 202 extends from the any of the first and second walls 202, 204 towards another of the first and second walls 202, 204. In the illustrated embodiment of FIG. 2, the mechanical fire detection line 202 extends from the first wall 202 towards the second wall 204. The mechanical fire detection line 202 further extends beyond the second wall 204, and passes through the second wall 204 to terminate at an output 208. Specifically, the mechanical fire detection line 202 passes through a through hole 210 provided on the second wall 204 and extends beyond the second wall 204 of the hood assembly 200 and terminates at the output 208. The output 208 may further be connected to other components, such as a trigger device 118, or the control box 120 (shown in FIG. 1). In some embodiments, the second wall 204 may include a recess 212. The recess 212 may include the through hole 210 through which the mechanical fire detection line 202 passes.

The mechanical fire detection line 202 may further include components such as sensors 230, and tensioned lines 232. The tensioned lines 232 are coupled to the sensors 230 and hold the sensors 230 under a predefined tension. In the event of an undesired fire, the heat of the fire may break the sensor 230, which results in the tension in the tensioned lines 232 reducing. This reduced tension may be detectable at the output 208 of the mechanical fire detection line 202, and may be used as a control signal to actuate the control box to deploy suitable countermeasures. In some embodiments, the mechanical fire detection line 202 may also include a tension indicating device (not shown) to determine that an optimum tension has been applied to the tensioned lines 232.

The hood assembly 200 further includes a restricting element 240 disposed at the through hole 210 on the second wall 204. The restricting element 240 may be disposed such that it is coaxial with the through hole 210. The restricting element 240 further includes a through holes (not shown), such that the through holes of the restricting element 240 and the second wall 204 may be coaxial. In the hood assembly 200, the mechanical fire detection line 202 may further pass through the restricting element 240 before terminating at the output 208.

The restricting element 240 is adapted to allow movement of the mechanical fire detection line 202 along a first direction, and limit movement of the mechanical fire detection line 202 along a second direction opposite to the first direction. In some embodiments, the first direction may be along the mechanical fire detection line 202 and outwards of the second wall 204, towards the output 208. In other words, the restricting element 240 may allow the mechanical fire detection line 202 to be pulled from a side of the second wall 204. This may allow for any additional tensioning of the mechanical fire detection line 202. Further, the restricting element 240 may limit movement of the mechanical fire detection line 202 towards the first wall 202. In other words, the restricting element 240 may limit the mechanical fire detection line 202 from losing tension. Thus, the restricting element 240 facilitates in maintaining the tension of the tensioned lines 232 within the hood assembly 200.

In some embodiments, the restricting element 240 may be made of a rigid material such as a metal, alloy, high density polymer, ceramic, etc. In some embodiments, the restricting element 240 may have a mechanism, such as a screw mechanism, that allows movement of the mechanical fire detection line 202 along the first direction, and limits the movement of the mechanical fire detection line 202 along the second direction.

In some embodiments, in case of the second wall having the recess 212, the restricting element 240 may have a width, such that after assembly of the restricting element 240, a surface of the restricting element 240 is flush with the second wall 204.

Figure 3:
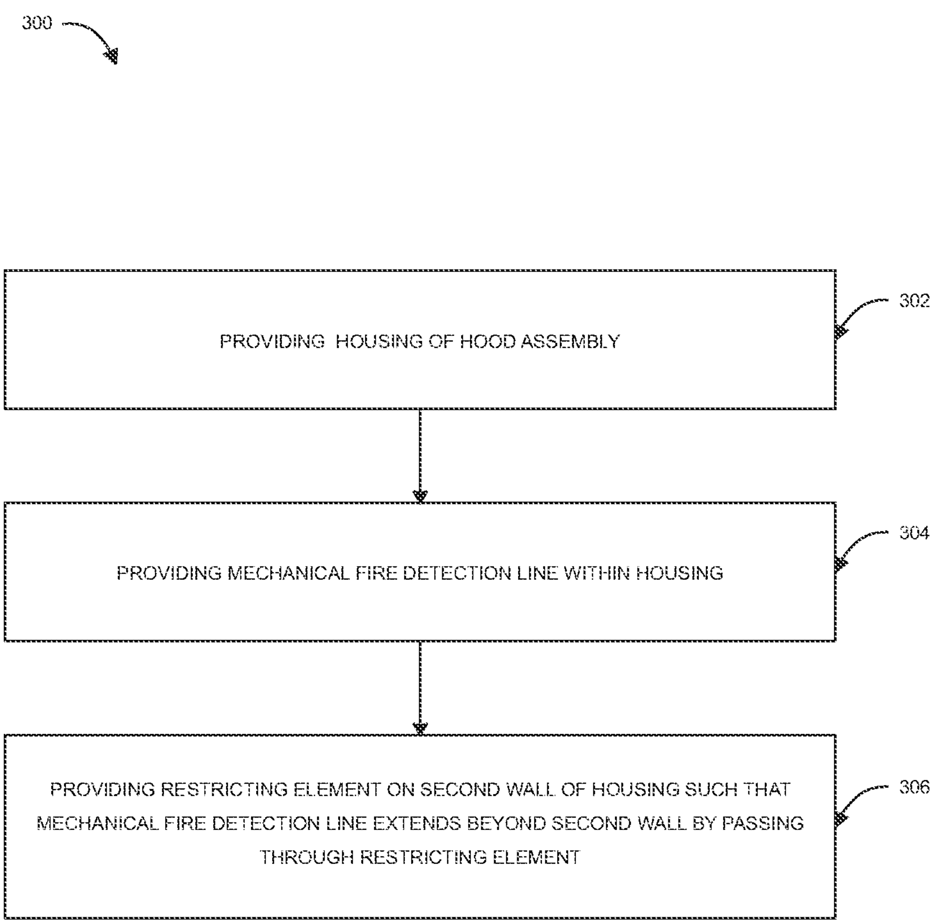
FIG. 3 is a flow diagram for a method to assemble to hood assembly for the fire suppression system including the mechanical fire detection line, in accordance with an embodiment of the invention.

FIG. 3 is a flow diagram for a method 300 for assembling the hood assembly 200. At step 302, the method 300 includes providing the housing 201 having the first and second walls 202, 204 arranged opposite to each other. The first and second walls 202, 204 are vertically oriented with respect to a floor on which the hood assembly 200 is placed. At step 304, the method 300 further includes providing the mechanical fire detection line 202 configured to detect presence of a fire within the housing 201. The mechanical fire detection line 202 is disposed between the first and second walls 202, 204, and extending beyond the second wall 204. At step 306, the method 300 further includes providing the restricting element 240 disposed on the second wall 204, such that the mechanical fire detection line 202 extends beyond the second wall 204 of the hood assembly 200 by passing through the restricting element 240. The restricting element 240 is adapted to allow movement of the mechanical fire detection line 202 along a first direction, and restrict movement of the mechanical fire detection line 202 along a second direction opposite to the first direction.

Thus, the hood assembly 200 provides a means to fully pre-install the mechanical fire detection line 202 within the hood assembly 200. The restricting element 240 allows the mechanical fire detection line 202 to be tensioned and limits any loss of tension that may occur in the mechanical fire detection line 202.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A hood assembly comprising:

a housing having first and second walls arranged opposite to each other to define a space, the first and second walls being vertically oriented with respect to a floor on which the hood assembly is placed;

a mechanical fire detection line configured to detect presence of a fire within the housing, the mechanical fire detection line disposed between the first and second walls, and extending beyond the second wall; and a rigid restricting element disposed on the second wall and within the space, such that the mechanical fire detection line extends beyond the second wall of the hood assembly by passing through a through hole of the restricting element that is coaxial with a through-hole formed in the second wall, wherein the restricting element includes a mechanical locking mechanism adapted to allow pull-through movement of the mechanical fire detection line along a first direction to tension the mechanical fire detection line within the space, and restrict movement of the mechanical fire detection line along a second direction opposite to the first direction to maintain tension on the mechanical fire detection line between the first and second walls.

2. The hood assembly of claim 1, wherein the first direction is along a length of the mechanical fire detection line towards the second wall, and wherein the second direction is along the length of the mechanical fire detection line towards the first wall.

3. The hood assembly of claim 1, wherein the second wall comprises a recess, and wherein the second wall comprises a through hole at the recess.

4. The hood assembly of claim 1, wherein the restricting element is disposed on the second wall at a recess.

5. The hood assembly of claim 1, wherein the mechanical fire detection line further comprises an output, wherein the mechanical fire detection line terminates at the output after it extends beyond the second wall of the hood assembly.

6. A method for assembling a hood assembly, the method comprising:

providing a housing having first and second walls arranged opposite to each other to define a space, the first and second walls being vertically oriented with respect to a floor on which the hood assembly is placed;

providing a mechanical fire detection line configured to detect presence of a fire within the housing, the mechanical fire detection line being disposed between the first and second walls, and extending beyond the second wall; and providing a rigid restricting element disposed on the second wall and within the space, such that the mechanical fire detection line extends beyond the second wall of the hood assembly by passing through a through hole of the restricting element that is coaxial with a through hole formed in the second wall, wherein the restricting element includes a mechanical locking mechanism is-adapted to allow pull-through movement of the mechanical fire detection line along a first direction to tension the mechanical fire detection line within the space, and restrict movement of the mechanical fire detection line along a second direction opposite to the first direction to maintain tension on the mechanical fire detection line between the first and second walls.

7. The method of claim 6, wherein the first direction is along a length of the mechanical fire detection line towards the second wall, and wherein the second direction is along the length of the mechanical fire detection line towards the first wall.

8. The method of claim 6, further comprising providing a recess on the second wall, and wherein the second wall comprises a through hole at the recess.

9. The method of claim 6, wherein the restricting element is disposed on the second wall at a recess.

10. The method of claim 6, further comprising providing the mechanical fire detection line with an output, wherein the mechanical fire detection line terminates at the output after it extends beyond the second wall of the hood assembly.

11. A fire suppression system comprising a hood assembly, the hood assembly comprising:

a housing having first and second walls arranged opposite to each other to define a space, the first and second walls being vertically oriented with respect to a floor on which the hood assembly is placed;

a mechanical fire detection line configured to detect presence of a fire arranged within the housing, the mechanical fire detection line disposed between the first and second walls, and extending beyond the second wall; and a rigid restricting element disposed on the second wall and within the space at a recess formed in the second wall, such that the mechanical fire detection line extends beyond the second wall of the housing by passing through a through hole of the restricting element that is coaxial with a through-hole formed in the second wall, wherein the restricting element includes a mechanical locking mechanism adapted to allow pull-through movement of the mechanical fire detection line along a first direction to tension the mechanical fire detection line within the space, and restrict movement of the mechanical fire detection line along a second direction opposite to the first direction to maintain tension on the mechanical fire detection line between the first and second walls.

* * * * *